Dec. 27, 1949     C. A. THOMAS     2,492,771
DYNAMOELECTRIC MACHINE
Filed Feb. 25, 1949
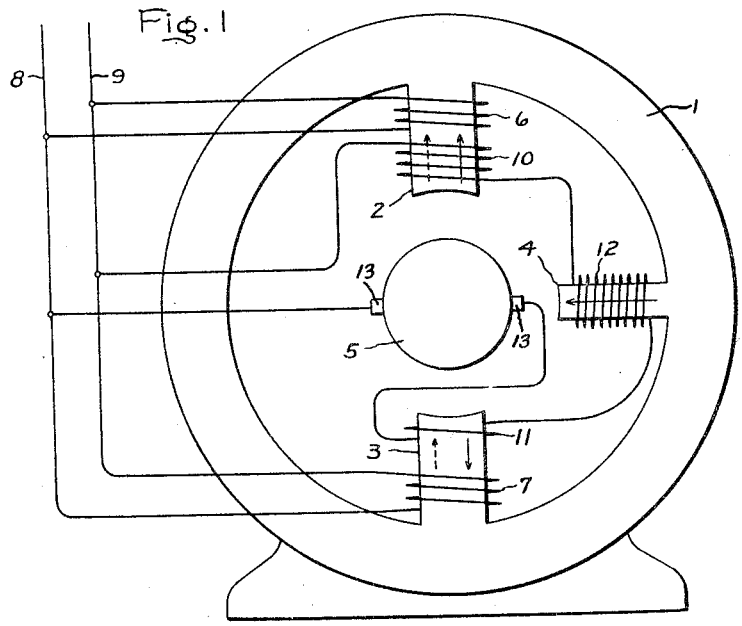
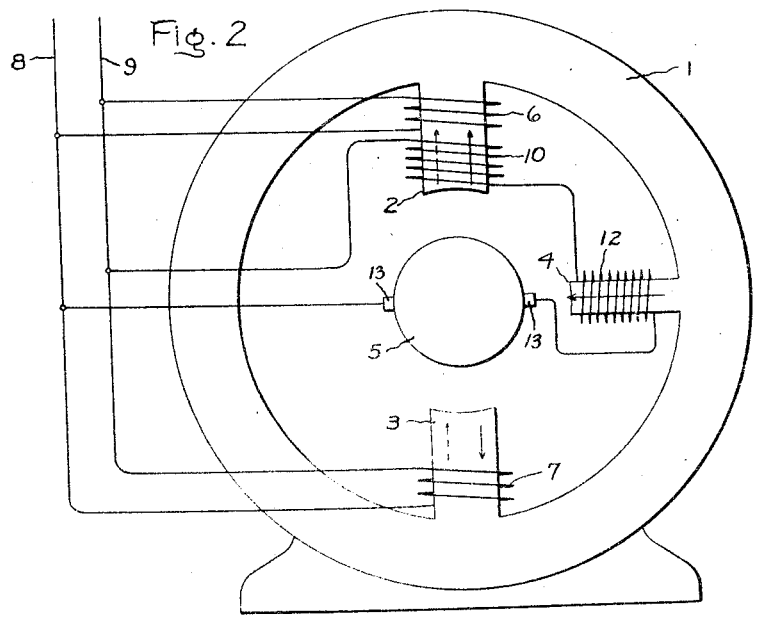
Inventor:
Charles A. Thomas
by *Purcell S. Mack*
His Attorney Patented Dec. 27, 1949

2,492,771

UNITED STATES PATENT OFFICE 2,492,771

DYNAMOELECTRIC MACHINE

Charles A. Thomas, Fort Wayne, Ind., assignor to General Electric Company, a corporation of New York Application February 25, 1949, Serial No. 78,382

3 Claims. (Cl. 171—228)

My invention relates to dynamoelectric machines and, more particularly to improvements in the field windings in such machines.

It is desirable in the design of dynamoelectric machines to reduce the cost, weight, input energy, and complexity of construction. It is therefore an object of my invention to accomplish these results by decreasing the overall size and weight of the field coils in a dynamoelectric machine without appreciably changing the magnetic fields in the machine.

My invention therefore consists essentially in increasing the size of certain field coils and decreasing or eliminating others, whereby a reduction or elimination of opposition between magnetic fields is effected so that the overall size and weight of the field coils may be reduced without appreciably changing the resultant magnetic field pattern.

My invention will be more completely understood by reference to the accompanying drawings and the following specification wherein Fig. 1 is schematic end view of a machine showing a preferred embodiment of my invention and Fig. 2 is a similar view of another machine showing another embodiment.

Referring to the machine shown in Fig. 1, stator yoke 1 supports main poles 2 and 3 (sometimes hereinafter referred to as main polar projections) and interpole 4 which are attached thereto. These poles extend radially inwardly for magnetic cooperation with one another through a rotating armature 5. Armature 5 is equipped with a commutator and commutator brushes 13. Main poles 2 and 3 are equipped with shunt windings including coils 6 and 7 which are connected to the outgoing electrical lines 8 and 9. Lines 8 and 9 are in turn connected to a suitable electrical power source if my machine is used as a motor or to a suitable electrical load if my machine is used as a generator. The power source and load are not shown since they may be conventional elements and form no part of my invention. Series windings including coils 10, 11 and 12 are provided on the main poles and interpole, these coils being connected electrically in series with one another and with the machine armature 5 through commutator brushes 13 across the outgoing lines 8 and 9.

In operation, coil 10 on pole 2 and coil 11 on pole 3 are each adapted to set up a magnetic field which is represented by the dotted arrows on each of these respective poles. The complete magnetic circuit for the flux which is set up by these coils is then upward through the main poles and the armature with return paths down around the stator yoke. This, of course, is neglecting the effect of coils 6 and 7 which may assist or oppose coils 10 and 11 depending upon whether the machine is cumulative or differentially compound wound. As shown, this machine would be cumulatively wound if used as a motor and differentially wound if used as a generator. However, my invention is primarily concerned with coils 10, 11, and 12, so that the effect of coils 6 and 7 is immaterial here and it will therefore be understood that these coils could be entirely eliminated without departing from the spirit and scope of my invention.

Coil 12 on interpole 4 is adapted to set up a magnetic field flux to the left, as shown by the arrow on this pole. Since in the interest of simplicity and economy there is only one interpole in this machine, there is no interpole disposed oppositely to interpole 4 through which the flux of interpole 4 may pass, therefore this flux, in order to complete its magnetic circuit, must pass through the armature and through the main poles in the direction shown by the solid arrows shown on poles 2 and 3 and around the stator yoke 1 back to interpole 4. It will be seen that this flux from interpole 4 indicated by the solid arrow on main pole 3 opposes the flux which main pole coil 11 is adapted to set up as indicated by the dotted arrow on pole 3, but the flux set up by coil 10 on pole 2 and coil 12 on interpole 4 reinforce one another as shown by the solid and dotted arrows on pole 2.

In a conventional machine coils 10 and 11 are made approximately of equal size with an approximately equal number of turns. But in my machine I have increased the number of turns of coil 10 and decreased the number of turns of coil 11 so that the coil 10 is more powerful to assist the interpole flux, and coil 11 is less powerful to resist the interpole flux set up by interpole coil 12. At the same time, the total number of turns in coil 10 plus those in coil 11 remain approximately the same as in a conventional machine so that the main pole flux indicated by the dotted arrows is not impaired. The result of my invention is that I have decreased the magnetic opposition in main pole 3 to passage of interpole flux and I have increased the magnetic reinforcement for this flux in main pole 2 without appreciably changing the magnetic effect of main coils 10 and 11 on main poles 2 and 3. Therefore the magnetic force required from coil 12 on interpole 4 to set up an interpole field of the desired strength is appreciably reduced by the change in proportionate sizes of main pole coils 10 and 11. As a result, coil 12 in my machine may be reduced in size with a reduced number of turns as compared to a conventional machine. It follows then that since the aggregate size of coils 10 and 11 is the same as in a conventional machine and the size of coil 12 has been reduced, coils 6 and 7 remaining unchanged, the aggregate size of the field windings has been reduced by my invention, with a consequent saving in cost, weight, and operating energy required.

Fig. 2 is the same as Fig. 1 except that in the machine illustrated, coil 11 has been eliminated and coil 10 has been correspondingly increased, thus achieving the maximum advantage to be obtained by a decrease in coil 11 and an increase in coil 10 as described above for the machine of Fig. 1. In addition to the advantages of my invention mentioned above for the embodiment of Fig. 1, the embodiment of Fig. 2 has the further advantage of greater economy and simplicity of manufacture since there is one less coil to wind, assemble, and connect than in a conventional machine.

It will of course be obvious to apply my invention to machines having more than one pair of main field poles and fewer interpoles than mail poles, as well as to other equivalent structures. Accordingly, while I have described and illustrated preferred embodiments of my invention, it should be understood that I do not intend to be restricted solely thereto but I intend to cover all modifications thereof which would be apparent to one skilled in the art and which come within the spirit and scope of my invention.

What I claim as new and desire to secure by Letters Patent of the United States is:

1. A commutator type dynamoelectric machine having an armature member provided with a commutator and a pair of contact brushes, a stator member having a yoke portion with a pair of main polar projections, and a single interpole intermediate said main polar projections, a main field exciting winding arranged in series with said brushes for producing main field flux, said main field flux traversing said armature and said main polar projections in one direction, and an interpole winding mounted on said interpole and arranged in series with said main field exciting winding and said brushes for producing interpole flux, said interpole flux aiding said main field flux in one of said main polar projections and opposing said main field flux in the other of said main polar projections, said main field exciting winding being arranged to produce a higher magneto-motive force in said one main polar projection than in said other main polar projection whereby a portion of said main field flux is diverted from said yoke portion through said interpole, said diverted main field flux aiding said interpole flux whereby the number of turns of said interpole winding can be reduced from the number necessary to produce the required interpole flux when the magneto-motive forces produced by said main field winding are equal in each main polar projection.

2. A commutator type dynamoelectric machine having an armature member provided with a commutator and a pair of contact brushes, a stator member having a yoke portion with a pair of main polar projections and a single interpole intermediate said main polar projections, a main field exciting winding arranged in series with said brushes for producing main field flux, said main field flux traversing said armature and said main polar projections in one direction, and an interpole winding mounted on said interpole and arranged in series with said main field exciting winding and said brushes for producing interpole flux, said interpole flux aiding said main field flux in one of said main polar projections and opposing said main field flux in the other of said main polar projections, said main field exciting winding being mounted on said one main polar projection whereby a higher magneto-motive force is produced in said one main polar projection than in said other main polar projection so that a portion of said main field flux is diverted from said yoke portion through said interpole, said diverted main field flux aiding said interpole flux whereby the number of turns of said interpole winding can be reduced from the number necessary to produce the required interpole flux when the magneto-motive forces produced by said main field winding are equal in each main polar projection.

3. A commutator type dynamoelectric machine having an armature member provided with a commutator and a pair of contact brushes, a stator member having a yoke portion with a pair of main polar projections and a single interpole intermediate said main polar projections, a main field exciting winding arranged in series with said brushes for producing main field flux, said main field flux traversing said armature and said main polar projections in one direction, and an interpole winding mounted on said interpole and arranged in series with said main field exciting winding and said brushes for producing interpole flux, said interpole flux aiding said main field flux in one of said main polar projections and opposing said main field flux in the other of said main polar projections, said main field exciting winding having more turns on said one main polar projection than on said other main polar projection whereby a portion of said main field flux is diverted from said yoke portion through said interpole, said diverted main field flux aiding said interpole flux whereby the number of turns of said interpole winding can be reduced from the number necessary to produce the required interpole flux when the magneto-motive forces produced by said main field winding are equal in each main polar projection.

CHARLES A. THOMAS.

No references cited.